(12) United States Patent
Marion, III et al.

(10) Patent No.: US 9,476,412 B2
(45) Date of Patent: Oct. 25, 2016

(54) RESISTIVELY HEATED SHAPE MEMORY POLYMER DEVICE

(71) Applicant: Lawrence Livermore National Security, LLC, Livermore, CA (US)

(72) Inventors: John E. Marion, III, Livermore, CA (US); Jane P. Bearinger, Livermore, CA (US); Thomas S. Wilson, San Leandro, CA (US); Duncan J. Maitland, College Station, TX (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 619 days.

(21) Appl. No.: 13/829,183

(22) Filed: Mar. 14, 2013

(65) Prior Publication Data

US 2014/0260237 A1     Sep. 18, 2014

(51) Int. Cl.
*F03G 7/06*         (2006.01)

(52) U.S. Cl.
CPC .......... *F03G 7/065* (2013.01); *B32B 2311/005* (2013.01); *Y10T 29/49002* (2015.01)

(58) Field of Classification Search
CPC ............. F03G 7/065; B32B 2311/005; Y10T 29/49099; Y10T 29/49101; Y10T 29/49174
See application file for complete search history.

(56) References Cited

U.S. PATENT DOCUMENTS

| | | | |
|---|---|---|---|
| 6,059,815 A | 5/2000 | Lee et al. | |
| 6,102,917 A | 8/2000 | Maitland et al. | |
| 6,160,084 A | 12/2000 | Langer et al. | |
| 6,388,043 B1 | 5/2002 | Langer et al. | |
| 6,418,252 B1 | 7/2002 | Maitland et al. | |
| 6,740,094 B2 | 5/2004 | Maitland et al. | |
| 7,386,203 B2 | 6/2008 | Maitland et al. | |
| 7,744,604 B2 | 6/2010 | Maitland et al. | |
| 2001/0001315 A1* | 5/2001 | Bates ................... | A61B 17/221 606/114 |
| 2006/0145544 A1* | 7/2006 | Browne .................. | F03G 7/065 310/306 |
| 2006/0238065 A1* | 10/2006 | Ishibashi .............. | H02N 11/006 310/300 |
| 2011/0275726 A1* | 11/2011 | Wilson ................... | C08G 18/83 521/50.5 |

* cited by examiner

*Primary Examiner* — Peter DungBa Vo
*Assistant Examiner* — Jeffrey T Carley
(74) *Attorney, Agent, or Firm* — Eddie E. Scott

(57) ABSTRACT

A resistively heated shape memory polymer device is made by providing a rod, sheet or substrate that includes a resistive medium. The rod, sheet or substrate is coated with a first shape memory polymer providing a coated intermediate unit. The coated intermediate unit is in turn coated with a conductive material providing a second intermediate unit. The second coated intermediate unit is in turn coated with an outer shape memory polymer. The rod, sheet or substrate is exposed and an electrical lead is attached to the rod, sheet or substrate. The conductive material is exposed and an electrical lead is attached to the conductive material.

25 Claims, 7 Drawing Sheets

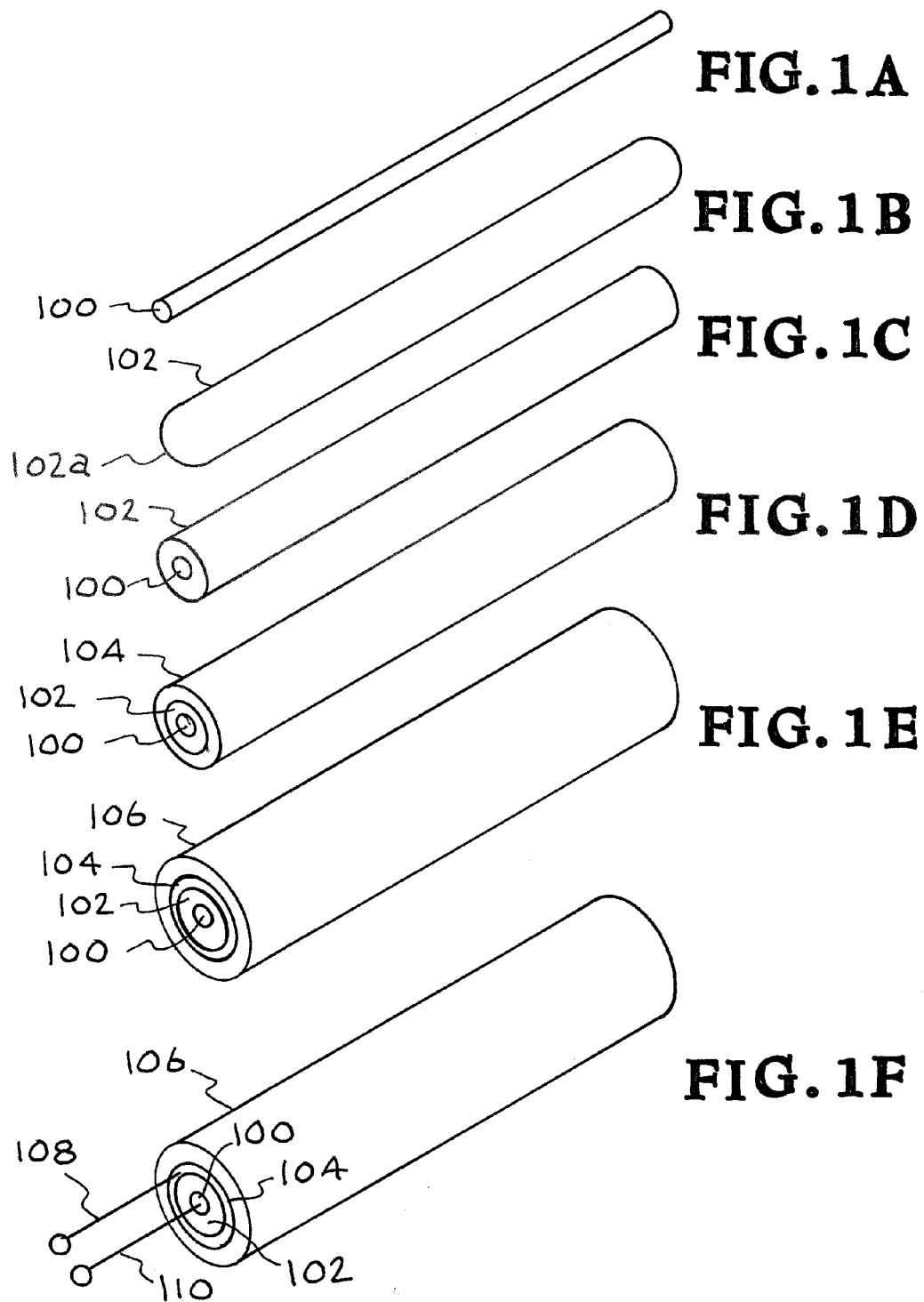

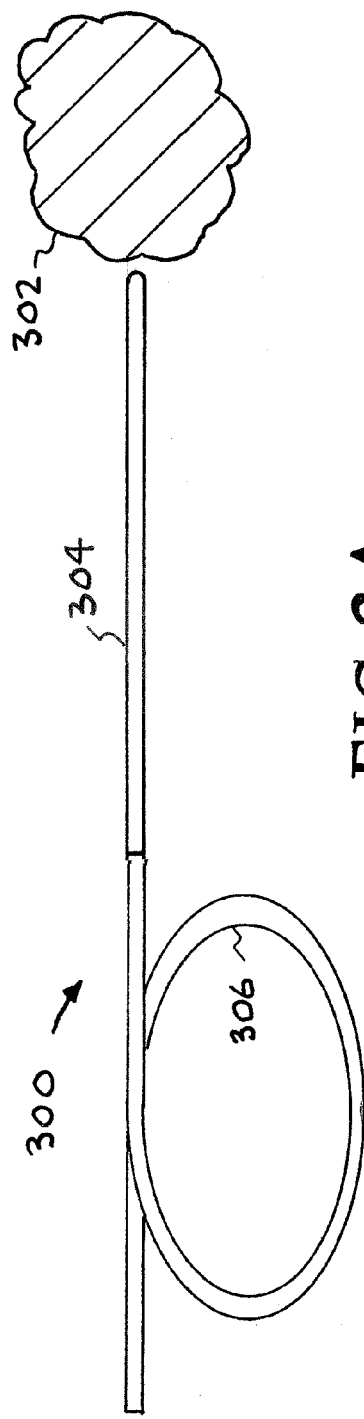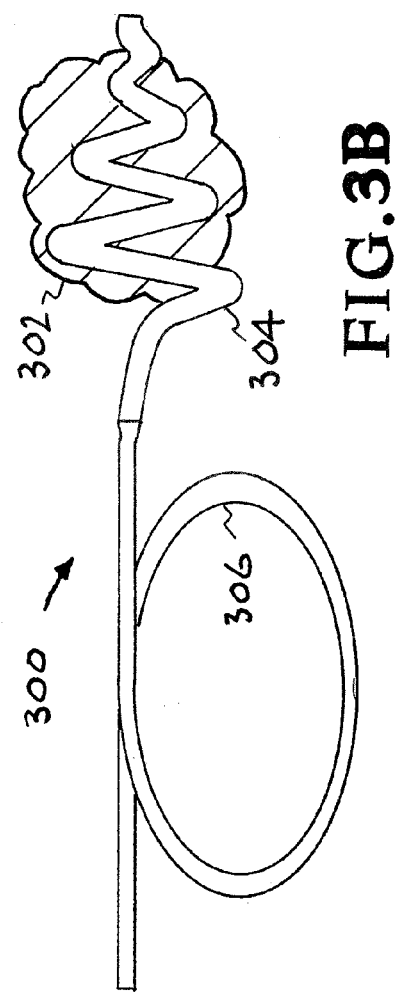
FIG.3A
FIG.3B

RESISTIVELY HEATED SHAPE MEMORY POLYMER DEVICE

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to a shape memory polymer device and more particularly to a resistively heated shape memory polymer device.

2. State of Technology

Shape-memory materials have the useful ability of being formable into a primary shape, being reformable into a stable secondary shape, and then being controllably actuated to recover their primary shape. Both metal alloys and polymeric materials can have shape memory. In the case of metals, the shape-memory effect arises from thermally induced solid phase transformations in which the lattice structure of the atoms changes, resulting in macroscopic changes in modulus and dimensions. In the case of polymeric materials, the primary shape obtained after processing and fixed by physical structures or chemical crosslinking. The secondary shape is obtained by deforming the material while is an elastomeric state and that shape is fixed in one of several ways including cooling the polymer below a crystalline, liquid crystalline, or glass transition temperature; by inducing additional covalent or ionic crosslinking, etc. While in the secondary shape some or all of the polymer chains are perturbed from their equilibrium random walk conformation, having a certain degree of bulk orientation. The oriented chains have a certain potential energy, due to their decreased entropy, which provides the driving force for the shape recovery. However, they do not spontaneously recovery due to either kinetic effects (if below their lower Tg) or physical restraints (physical or chemical crosslinks). Actuation then occurs for the recovery to the primary shape by removing that restraint, e.g. heating the polymer above its glass transition or melting temperature, removing ionic or covalent crosslinks, etc.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

This present invention provides a resistively heated shape memory polymer device. The device is operated using resistive heating to heat the shape memory polymer device. The resistively heated shape memory polymer device is made by providing a rod, sheet or substrate that in chides a resistive medium. The rod, sheet or substrate is coated with a first shape memory polymer providing a coated intermediate unit. The coated intermediate unit is in turn coated with a conductive material providing a second intermediate unit. The second coated intermediate unit is in burn coated with an outer shape memory polymer. The rod, sheet or substrate is exposed and an electrical lead is attached to the rod, sheet or substrate. The conductive material is exposed and an electrical lead is attached to the conductive material. In one embodiment the shape memory polymer device is in the form of a shape memory polymer corkscrew. In another embodiment the shape memory polymer device is in the form of a shape memory polymer basket.

The invention is susceptible to modifications and alternative forms. Specific embodiments are shown by way of example. It is to be understood that the invention is nut limited to the particular forms disclosed. The invention covers, all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIGS. 1A through 1F illustrate the forming of a rod of conductive SMP composite.

FIGS. 3A and 3B illustrated the construction and operation of the shape memory polymer coil constructed in accordance with FIGS. 1A-1D and illustrated in FIGS. 2A and 2B.

DETAILED DESCRIPTION OF SPECIFIC EMBODIMENTS

Figure 2A:
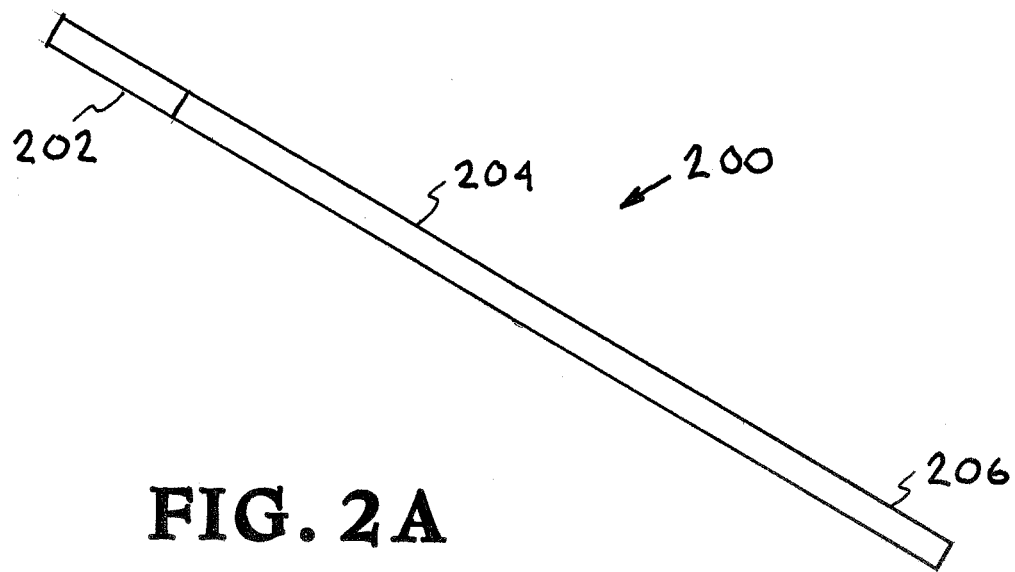
FIGS. 2A and 2B illustrate one embodiment of a shape memory polymer coil of the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

This present invention provides a resistively heated shape memo polymer device. Shape memory polymer (SMP) is a polymeric material which can be formed into a specific "primary" shape, reformed into a "secondary" stable shape, she controllably actuated so that it recovers its primary shape. This present invention provides a device and a method of making the device wherein the device is operated using resistive heating to heat the SMP device.

In one embodiment the resistive element is a conductive polymer composite. Conductive composites can be made by adding conductive materials to the polymer including but not limited to carbon black (CB), single or multiwalled nanotubes (SWNT or MWNT respectively), metallic fillers, or other non-metallic conductive fillers. The polymer binder may be SMP or may be any other type of polymer.

The carbon nanotubes may be chemically modified so as to chemically incorporate them into the polymer network. The conductive composite may be embedded in non-conductive polymer. Conductive composites have the property whereby the resistance of the composite increases with the temperature. This could be used such that as a section of SMP reaches its transition temperature, the resistance goes nose that another part of the device begins heating. The conductive composite may be formed such that a specific circuit is formed. This would allow the device to be actuated in a very a controlled way. By changing the conductivity of the composite, it could be possible to make addressed actuators.

Referring now to the drawings and in particular to FIGS. 1A through 1D, one embodiment of a resistively heated shape memory polymer device constructed in accordance with the present invention is illustrated. The resistive medium of the resistively heated shape memory polymer device may be suitable resistive wire or may be a composite containing conductive particles including but limited to carbon black, carbon nanotubes and metallic fillers. The resistively heated shape memory polymer device may be made from conductive composite or may only contain conductive composite as the resistive heating element Referring now to FIG. 1A, a rod 100 of conductive SMP composite is formed. The rod 100 can be made suitable resistive wire, or may be a composite containing conductive particles including but limited to carbon black carbon nanotubes and metallic fillers.

Referring now to FIG. 1B, the rod 100 is dip coated in neat SMP 102. This provides a rod 100 with a coating of neat SMP 102.

Referring now to FIG. 1C, the tip 102A and neat SMP 102 coating of the device shown in FIG. 2 is cut off to expose the red 100. This provides a rod 100 with a coating of neat SMP 102 and the end of the rod 104 exposed.

Referring now to FIG. 1D, the rod 100 with a coating of neat SMP 102 are then dip-coated in a layer of conductive composite 104. This provides a rod 100 coated with neat SMP 102 which is in turn coated with a coating of conductive composite 104.

Referring now to FIG. 1E, the rod 100 with a coating of neat SMP 102 that is coated with conductive composite 104 is then dip-coated in a final dip coat of neat SMP 106. This provides a rod 100 coated with neat SMP 102 which is in turn coated with a coating of conductive composite. 104 which is in turn coated with a coating of neat SMP 106.

Referring now to FIG. 1F, wire leads 108 and 110 are attached to the inner conductive core (rod 100) and the conductive layer 104. The wire lead 108 is attached to the inner conductive core (rod 100). The wire lead 110 is attached to the conductive layer 104. This provides a resistively actuated SMP rod which can be reprogrammed into another shape such as a coil shape or other shape.

Figure 2B:
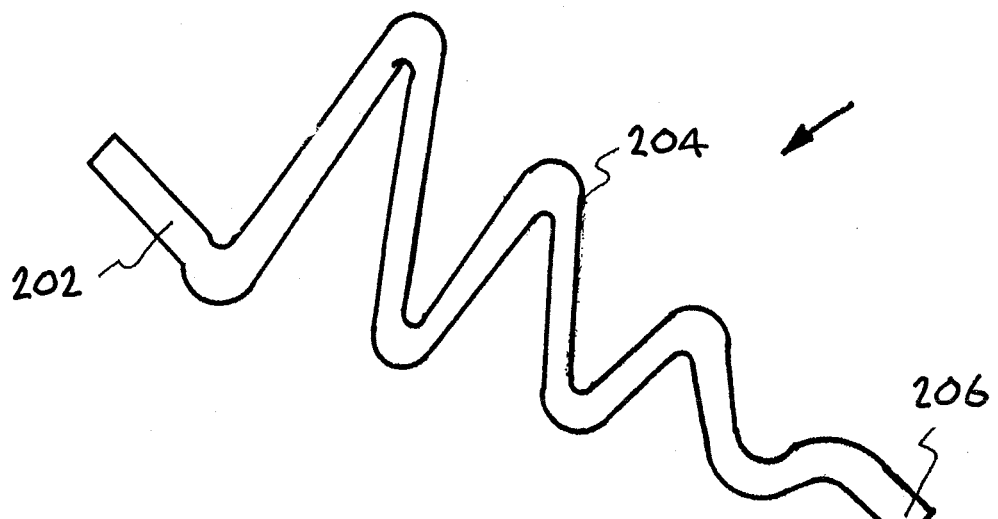

Referring now to FIGS. 2A and 2B a shape memory polymer coil of one embodiment of an actuator for acting upon a material in a vessel of the present invention is shown. The shape memory polymer coil of this embodiment is designated generally by the reference numeral 200. The shape memory polymer coil 100 includes the following structural components: an attachment end 202, a coil corkscrew body 204, and a distal end 206. The attachment end 207 of the shape memory polymer coil is attached to the distal end of a transport vehicle such as a guide wire (not shown). The shape memory polymer coil 200 comprises as shape memory polymer (SMP), a polymer that can be formed into a primary or equilibrium shape, re-formed into a stable secondary or stressed shape, and actuated by controlled heating to recover its primary shape.

Referring now to FIGS. 3A and 3B the construction and operation of the shape memory polymer coil constructed in accordance with FIGS. 1A-1D and illustrated in FIGS. 2A and 2B will be described. This embodiment of a shape memory polymer coil is designated generally by the reference numeral 300. The shape memory polymer coil 300 provides a mechanical device, to be attached to a transport vehicle and delivered via a catheter 306, to remove non-vascular or vascular occlusions 302 (e.g., blood clot) from the body. The shape memory polymer coil 300 dimensions depend on the size and location of the occlusion targeted for removal (e.g., a device used to remove a carotid artery occlusion may be larger than a device used to remove, an occlusion located further up in the neurovasculature).

The shape memory polymer coil 300 is shown in its expanded form in FIG. 3B. The shape memory polymer coil 300 is initially in its collapsed secondary straight form shown in FIG. 3A as the shape memory polymer coil 300 is pushed distally through the occlusion 302. With the coil body 304 positioned distal to the occlusion 302, the coil is thermally actuated into its expanded primary forms by heating above the soft phase glass transition temperature of the SMP. The expanded shape memory polymer coil 300 is retracted until the occlusion is captured. The expanded shape memory polymer coil 300 and the captured occlusion 302 are withdrawn from the body.

Various incarnations of the shape memory polymer coil 300 are possible depending on the actuation mechanism. Actuation mechanisms include resistive heating. Additionally, the shape memory polymer coil 300 may actuate at physiological temperature through a depression in the SMP glass transition temperature caused by exposure to physiological fluids or those injected through the catheter. Though the design and construction of the shape memory polymer coil 300 are specific to the actuation mechanism, the various incarnations of the devices are functionally identical.

Referring again to FIG. 3A and FIG. 3B, two diagrams are shown to illustrate principles of operation of the shape memory polymer expandable coil 300. In FIG. 3A the shape memory polymer expandable coil 300 is shown in its collapsed secondary form wherein the coil body 304 can be pushed distally through an occlusion 302. In FIG. 3B the shape memory polymer expandable coil 300 is shown in its expanded primary form wherein the expanded coil 300 can capture the occlusion 302.

Referring now to FIGS. 4A through 4D, another embodiment of a resistively heated shape memory polymer device constructed in accordance with the present invention is illustrated. The resistive medium of the resistively heated shape memory polymer device may be suitable resistive wire, or may be a composite containing conductive particles including but limited to carbon black, carbon nanotubes, and metallic filters. The resistively heated shape memory polymer device may be made from conductive composite or may only contain conductive composite as the resistive heating element Referring now to FIG. 4A, a sheet or substrate 400 of conductive SMP composite is formed. The sheet or substrate 400 can be made suitable resistive material, or may be a composite containing conductive particles including but limited to carbon black, carbon nanotubes, and metallic fillers.

Figure 4A:
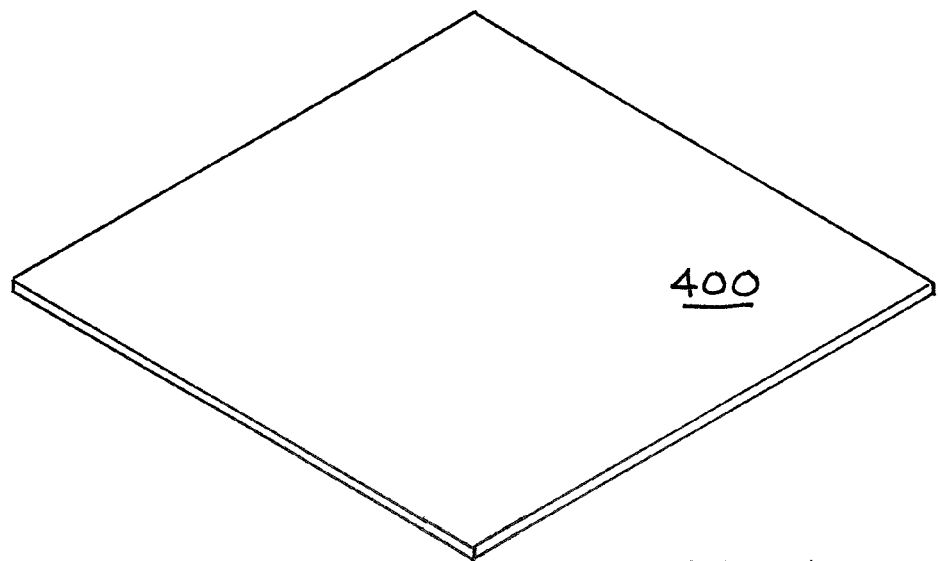
FIGS. 4A through 4D illustrate another embodiment of a resistively heated shape memory polymer device constructed in accordance with the present invention.
Figure 4B:
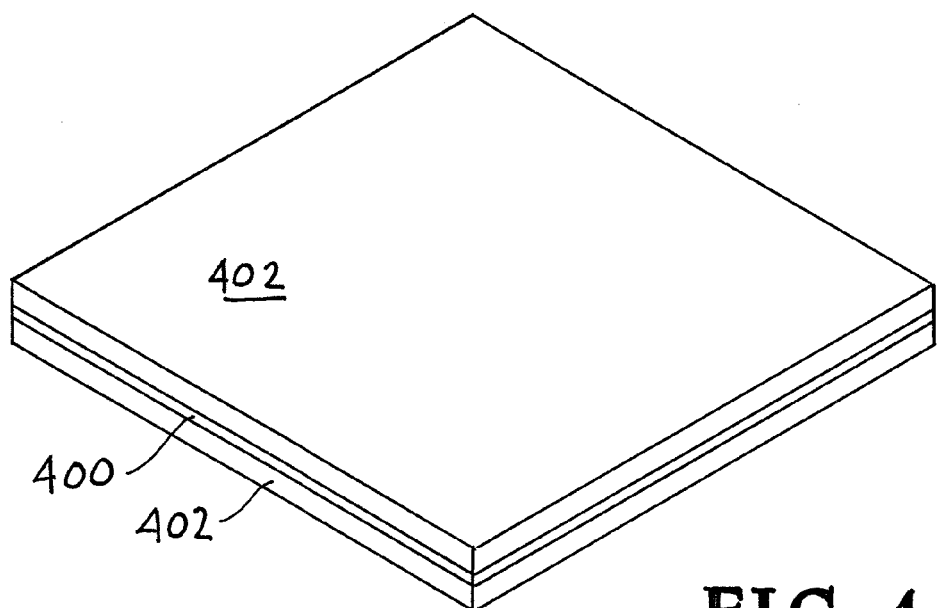
Figure 4C:
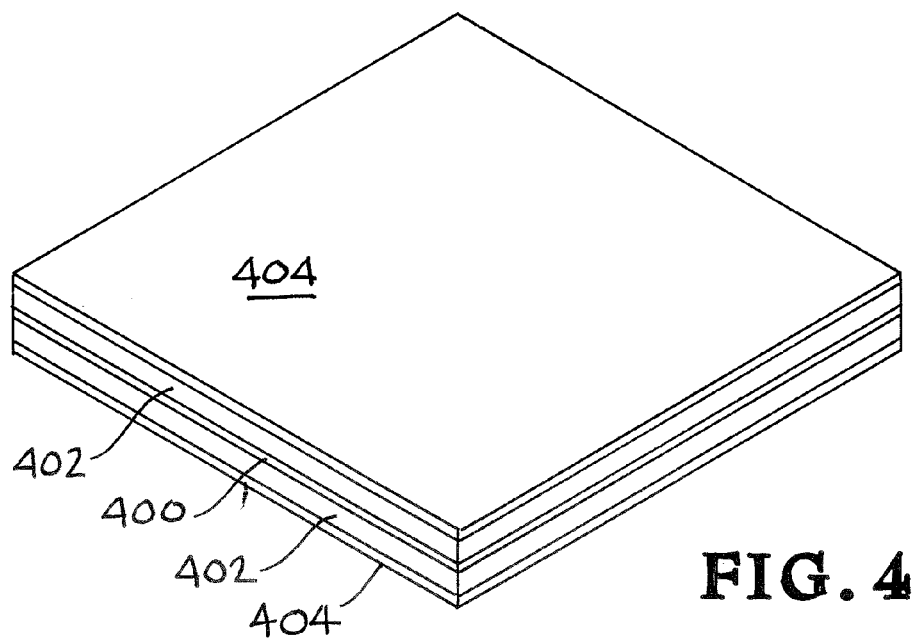

Referring now to FIG. 4B, the sheet or substrate 400 is coated with SMP 402. This provides a sheet or substrate 400 with a coating of SMP 402.

Referring now to HG. 4C, the sheet or substrate 400 with a coating of SMP 402 is then coated in a layer of conductive composite 404. This provides a sheet or substrate 400 coated with SMP 402 which is in turn coated with a coating of conductive composite 404.

Figure 4D:
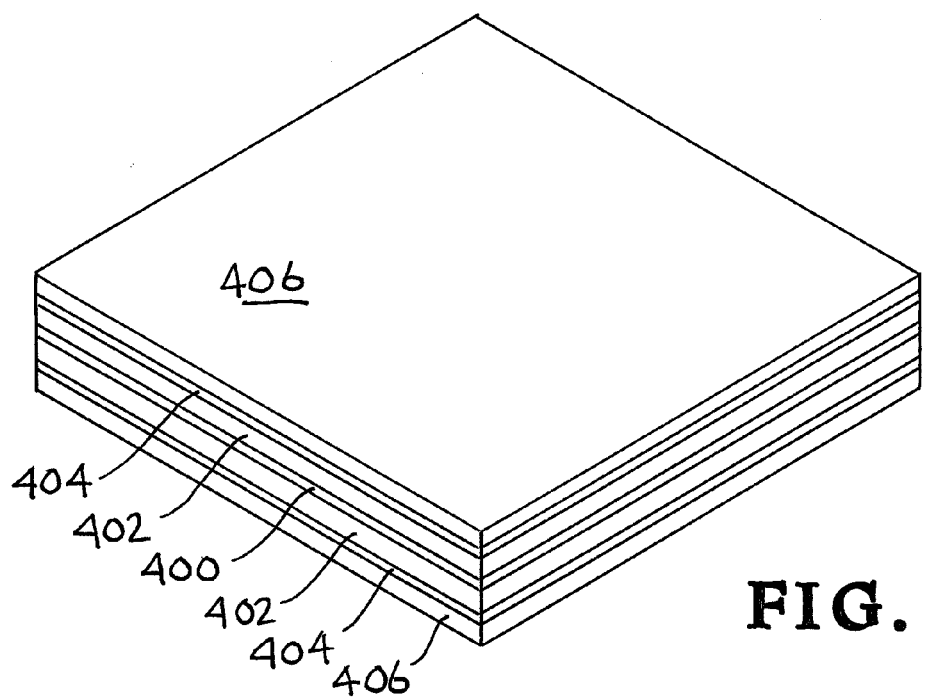

Referring now to FIG. 4D, the sheet or substrate 400 with a mating of SMP 402 that is coated with conductive composite 404 is then coated in as final dip coat of SMP 406. This provides a sheet or substrate 400 coated with SMP 402 which is in turn coated with, a coating of conductive composite 404 which is in turn coated with a coating of SMP 406. The sheet or substrate 400 coated with SMP 402 provides a flat film of conductive composite can be laser cut into a complex shape which is embedded in a shape memory polymer device, such as a basket. This provides a basket that can be heated in a controlled way Referring now to FIG. 5 a shave memory polymer coil of another embodiment of an actuator for acting upon a material in a vessel of the present invention is shown. As previously described, the flat film of conductive composite can be laser cut into a complex shape which with the embedded in a shape memory polymer device. This can be used to produce a basket as will hereinafter be described. The basket can be heated in a controlled way. The shape memory polymer coil comprises a shape memory polymer (SMP), a polymer that can be formed into a primary or equilibrium shape, re-formed into a stable secondary or stressed shape, and actuated by controlled heating to recover its primary shave.

Figure 5:
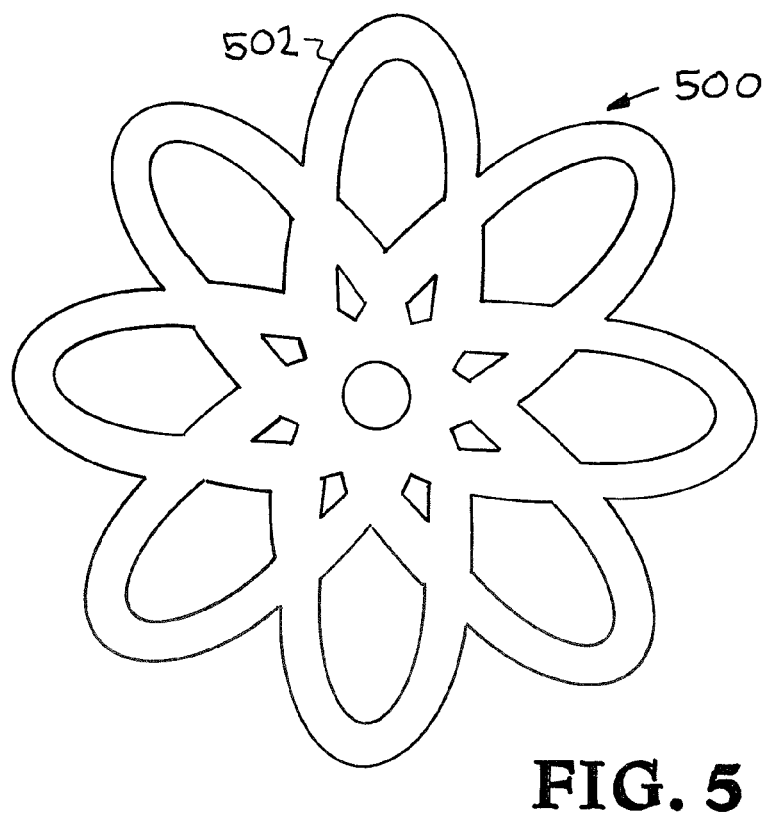
FIG. 5 illustrates the making of another embodiment of a shape memory polymer coil of the present invention.

As illustrated in FIG. 5, the template for a shape memory polymer basket is laser cut from the flat film of conductive composite previously described. The template is designated generally by the reference numeral 500. The cut portion 502 can be used to produce a shape memory polymer basket.

Figure 6:
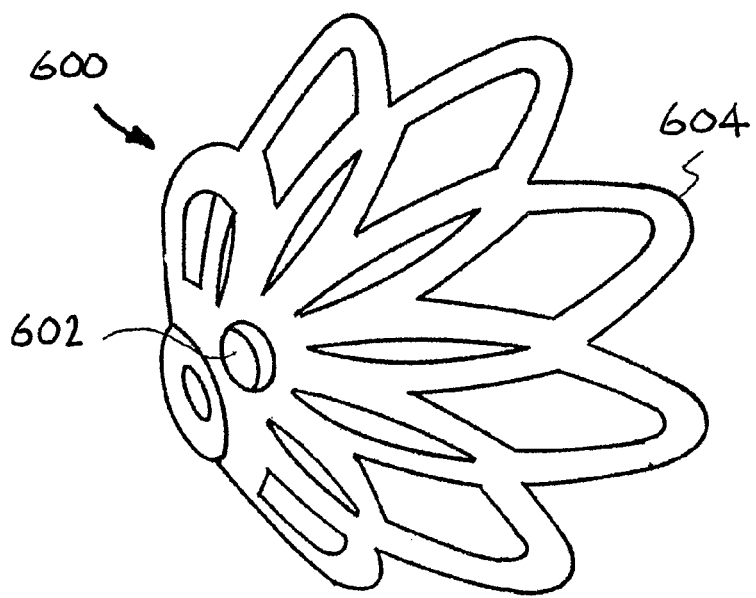
FIG. 6 illustrates another embodiment of a shape memory polymer coil of the present invention.

Referring now to FIG. 6, an illustration of a shape memory polymer basket of one embodiment of an actuator for acting upon a material in a vessel of the present invention is shown. The shape memory polymer basket of this embodiment is designated generally by the reference numeral 600. The shape memory polymer basket 600 includes the following structural components: an attachment portion 602 and an expandable basket portion 604. The attachment portion 602 of the shape memory polymer basket 600 is adapted to be connected to the distal end of a catheter and attached to the catheter. This catheter is also used to deliver the shape memory polymer coil. The shape memory polymer basket 600 comprises a shape memory polymer (SMP), a polymer that can be formed into a primary or equilibrium shape, re-formed into a stable secondary or stressed shape, and actuated by controlled heating to recover its primary shape.

Figure 7A:
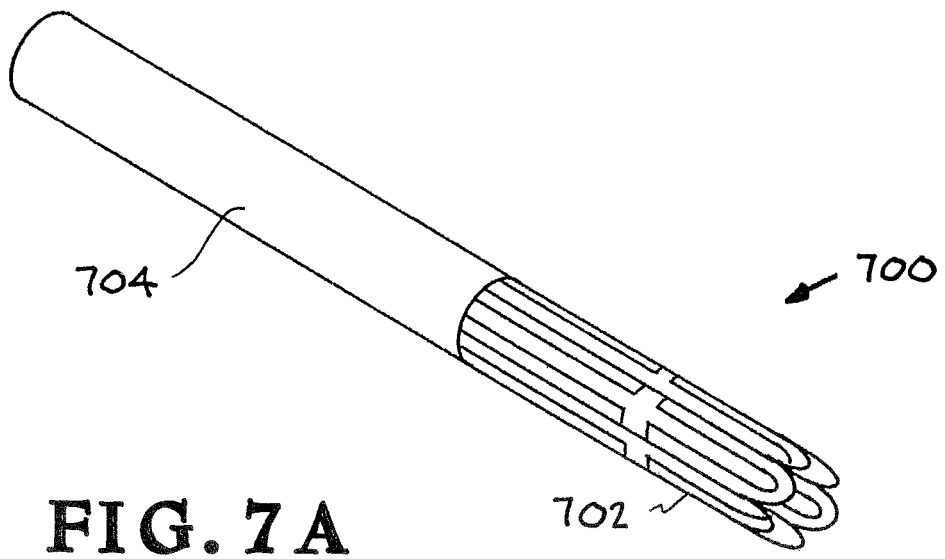
FIGS. 7A and 7B illustrate the operation of the shape memory polymer basket.
Figure 7B:
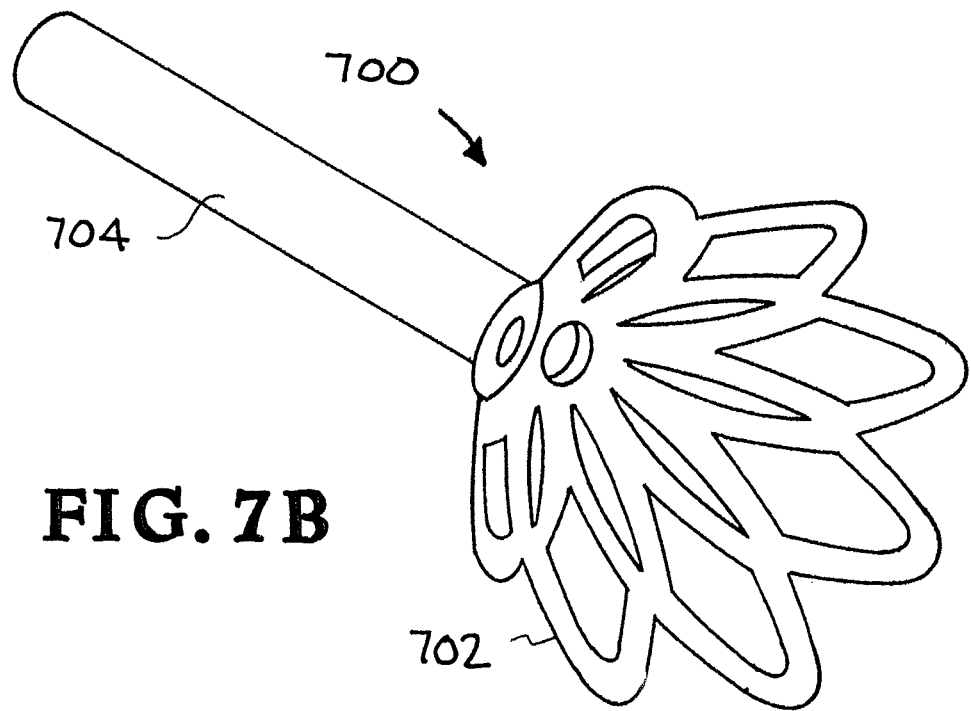

The structural components of the shape memory polymer basket having been described and illustrated in connection with FIGS. 5 and 6, the construction and operation of the shape memory polymer basket will now be described with reference to FIGS. 7 and 8. The shape memory polymer basket is designated generally by the reference numeral 700. The shape memory polymer basket 700 provides a mechanical device, to be situated at the distal end of a catheter, to remove non-vascular or vascular occlusions (e.g., blood clot) from the body. The shape memory polymer basket dimensions depend on the size and location of the occlusion targeted for removal (e.g., a device used to remove a carotid artery occlusion may be larger than a device used to remove an occlusion located further up in the neurovasculature).

The shape memory polymer basket 700 is shown in its expanded form in FIG. 8. The shape memory polymer basket 700 is situated at the distal end of a catheter. The shape memory polymer basket 700 is initially in its collapsed secondary form shown in FIG. 7. The shape memory polymer basket 700 is moved until it is near an occlusion. With the basket body 702 positioned near the occlusion; the basket is thermally actuated into its expanded primary form by heating above the soft phase glass transition temperature of the SMP. The transport vehicle with the attached expanded shape memory polymer basket 700 is retracted through the catheter until the occlusion is wedged against the expandable basket portion 702 to capture the occlusion. The expanded shape memory polymer basket 700 and the captured occlusion are withdrawn from the body.

Various incarnations of the shape memory polymer basket 700 are possible depending on the actuation mechanism. Actuation mechanisms include resistive heating. Additionally, the shape memory polymer basket 700 may actuate at physiological temperature through a depression in the SMP Tg caused by exposure to physiological fluids or those injected through the catheter.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of making a resistively heated shape memory polymer device, comprising the steps of:
   providing a conductive substrate including a resistive medium,
   coating said conductive substrate with a first shape memory polymer,
   coating said first shape memory polymer coated conductive substrate with a first conductive material member,
   coating said first conductive material member coated first shape memory polymer coated conductive substrate with a second shape memory polymer,
   exposing a portion of said conductive substrate and exposing a portion of said first conductive material member,
   attaching a first electrical lead to said exposed portion of said conductive substrate, and
   attaching a second electrical lead to said exposed portion of said first conductive material member;
   wherein (a) the first shape memory polymer directly contacts the first conductive material member; (b) the conductive substrate directly contacts the first shape memory polymer, and (c) the first conductive material member directly contacts the second shape memory polymer.

2. The method of making a resistively heated shape memory polymer device of claim 1 wherein said resistive medium is a solid conductive material.

3. The method of making a resistively heated shape memory polymer device of claim 1 wherein said resistive medium is a composite containing conductive particles.

4. The method of making a resistively heated shape memory polymer device of claim 3 wherein said conductive particles include carbon black.

5. The method of making a resistively heated shape memory polymer device of claim 3 wherein said conductive particles include carbon nanotubes.

6. The method of making a resistively heated shape memory polymer device of claim 3 wherein said conductive particles include metallic fillers.

7. The method of making a resistively heated shape memory polymer device of claim 1 wherein said conductive substrate includes conductive particles.

8. The method of making a resistively heated shape memory polymer device of claim 1 further comprising the step of forming said second shape memory polymer coated first conductive material member coated first shape memory polymer coated conductive substrate into a shape memory polymer basket.

9. The method of making a resistively heated shape memory polymer device of claim 8 wherein said step of forming said second shape memory polymer coated first conductive material member coated first shape memory polymer coated conductive substrate into a shape memory polymer basket comprises laser cutting said second shape memory polymer coated first conductive material member coated first shape memory polymer coated conductive substrate in the shape of a shape memory polymer basket.

10. The method of claim 1, wherein the conductive substrate includes a conductive sheet.

11. The method of claim 1, wherein coating said conductive substrate with the first shape memory polymer includes dip-coating said conductive substrate with the first shape memory polymer.

12. The method of claim 1, wherein the first shape memory polymer has a primary shape and a secondary shape and the first shape memory polymer transitions from the secondary shape to the primary shape when the first shape memory polymer is heated above its glass transition temperature.

13. The method of claim 1, wherein:
coating said first conductive material member coated first shape memory polymer coated conductive substrate with a second shape memory polymer includes coating said first conductive material member with said second shape memory polymer such that the second shape memory polymer directly contacts the conductive material.

14. A method of making a resistively heated shape memory polymer device comprising:
providing a conductive substrate including a resistive medium;
coating the conductive substrate with a first shape memory polymer (SMP);
coating the first SMP coated conductive substrate with a conductive material;
coating the conductive material coated first SMP coated conductive substrate with a second SMP;
forming the second SMP coated conductive material coated first SMP coated conductive substrate into a SMP basket;
exposing a portion of the conductive substrate and a portion of the conductive material;
attaching a first electrical lead to the exposed portion of the conductive substrate; and
attaching a second electrical lead to the exposed portion of the conductive material.

15. The method of claim 14 wherein the resistive medium is a solid conductive material.

16. The method of claim 14 wherein the resistive medium is a composite containing conductive particles.

17. The method of claim 16 wherein the conductive particles include carbon black.

18. The method of claim 16 wherein the conductive particles include carbon nanotubes.

19. The method of claim 16 wherein the conductive particles include metallic fillers.

20. The method of claim 14 wherein the conductive substrate includes conductive particles.

21. The method of claim 14 wherein the forming the second SMP coated conductive material coated first SMP coated conductive substrate into a SMP basket comprises laser cutting the second SMP coated conductive material coated first SMP coated conductive substrate in the shape of a SMP basket.

22. The method of claim 14, wherein the conductive substrate includes a conductive sheet.

23. The method of claim 14, wherein the conductive substrate directly contacts the first SMP and the conductive material directly contacts the second SMP.

24. The method of claim 14, wherein the first SMP directly contacts the conductive material.

25. The method of claim 14, wherein coating the conductive material coated first SMP coated conductive substrate with a second SMP includes coating the conductive material with the second SMP.

* * * * *